US006400948B1

(12) United States Patent
Hardin (10) Patent No.: US 6,400,948 B1
(45) Date of Patent: Jun. 4, 2002

(54) SYSTEMS AND METHODS FOR ACQUIRING A CONTROL CHANNEL

(75) Inventor: Stephen T. Hardin, Snellville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/026,462

(22) Filed: Feb. 19, 1998

(51) Int. Cl.[7] ................................................. H04Q 7/20
(52) U.S. Cl. ........................ 455/434; 455/419; 455/558
(58) Field of Search ................................. 455/434, 464, 455/515, 435, 466, 513, 432, 418, 419, 414; 375/224; 370/252; 379/357, 558

(56) References Cited

U.S. PATENT DOCUMENTS

| 5,384,834 A | * | 1/1995 | Sato et al. .................... 379/357 |
| 5,570,467 A | * | 10/1996 | Sawyer ........................ 455/515 |
| 5,606,548 A | * | 2/1997 | Vayrynen et al. ............ 370/252 |
| 5,809,419 A | * | 9/1998 | Schellinger et al. ......... 455/434 |
| 5,903,832 A | * | 5/1999 | Seppanen et al. ............ 455/414 |
| 5,950,130 A | * | 9/1999 | Coursey ....................... 455/419 |
| 5,953,665 A | * | 9/1999 | Mattila ........................ 455/434 |

FOREIGN PATENT DOCUMENTS

| EP | 0 240 073 | 10/1987 | ............ H04Q/7/04 |
| EP | 0 779 754 | 6/1997 | ............ H04Q/7/22 |
| EP | 0 836 340 | 4/1998 | ............ H04Q/7/32 |
| WO | WO 96/39787 | 12/1996 | ............ H04Q/7/32 |

OTHER PUBLICATIONS

International Search Report of PCT/US99/00582 mailed May 4, 1999 by European Searching Authority of the PCT.
"Intelligent Roaming," Telecommunications Industry Association—Digital Cellular Systems—TR45.3.6, Apr. 28–30, 1997, Bellevue, Washington.

(List continued on next page.)

*Primary Examiner*—Nay Maung
(74) *Attorney, Agent, or Firm*—Li K. Wang, Esq.; Geoff L. Sutcliffe, Esq.; Kilpatrick Stockton, Esq.

(57) ABSTRACT

A radiotelephone system having DCCH channels includes an over-the-air activation teleservice sub-system (OTAF) for programming mobile stations (MS) with Intelligent Roaming (IR) information. Each MS includes a history list containing the most recently used DCCHs. The IR information sent to a MS includes data for setting the number of entries in the history list, data for setting the content of the history list entries, and a data for setting the power level threshold. The number of entries in each MS can be optimally set according to the number of DCCHs in a network with networks having a greater number of DCCHs being able to place a greater number of entries in the history list of their subscribing MSs. The content of the history list, moreover, may be optimally set for a network and for a particular cell or group of cells in a network. Thus, for instance, an MS entering a new network can be programmed to have the DCCHs of the new network. The power level threshold is used by the MS to detect suitable DCCHs. By setting the power level threshold, an MS can be optimized according to the RF planning of its carrier. As a result, the threshold selected by the MS can coincide with the carrier's intended reselection power level threshold.

40 Claims, 7 Drawing Sheets

OTHER PUBLICATIONS

"Over–the–Air Programming Teleservice to Support Intelligent Roaming," Telecommunications Industry Association Time Division Digital Technology Mobile and Personal Communications Standards TR45.3.6, Dec. 15–19, 1997, San Antonio, Texas.

"Proposed IS–136 Baseline Text for Intelligent Roaming," Telecommuications Industry Association Time Division Digitial Technology Mobile and Personal Communications Standards TR45.3.6, Dec. 15–19, 1997, San Antonio, Texas.

"Stage 2 Flows for OPTS to Support Intelligent Roaming Database Downloading," Telecommunications Industry Association Time Division Digital Technology Mobile and Personal Communications Standards TR45.3.6, Dec. 15–19, 1997, San Antonio, Texas.

TR45 TIA/EIA 136–123 Draft Text "Digital Control Channel Layer 3," Feb. 6, 1998.

TR45 TIA/EIA–136–123A Draft Text "Digital Control Channel Layer 3," Nov. 20, 1998.

TR45 TIA/EIA–136–730 Draft Text, "Over–the–Air Programming Teleservice (OPTS)," Nov. 20, 1998.

* cited by examiner

SYSTEMS AND METHODS FOR ACQUIRING A CONTROL CHANNEL

FIELD OF THE INVENTION

The present invention relates generally to systems and methods for allowing radiotelephones to acquire a control channel and, more particularly, to systems and methods for acquiring a control channel for selectively setting the number of entries in a history list, the content for the entries in the history list, and a threshold power level for a control channel.

BACKGROUND OF THE INVENTION

A mobile radiotelephone system includes a base station serving one or more cells and a plurality of radiotelephones, which are commonly mobile radiotelephones or mobile stations. The radiotelephones communicate with the base station through two different types of channels. The first channel is a voice channel and is used to carry voice and other transmissions between the radiotelephone and a base station. The other type of channel is a control channel and is generally used by the radiotelephone in acquiring a voice channel and in obtaining other service from the base station. For instance, control channels are used by a radiotelephone to select a particular cell within a radiotelephone network and to acquire a voice channel. The control channels are also used for various other purposes.

In the United States, the predominate radiotelephone system for mobile radiotelephones, or cellular phones, is the Advanced Mobile Phone System (AMPS). AMPS is an analog cellular system deployed nationwide and currently uses a common set of 21 analog control channels from which a mobile radiotelephone can obtain service, receive pages for incoming calls, and originate outgoing calls. In general, the bandwidth available for AMPS is divided into an A-Band and a B-Band with these two bands being serviced by two different carriers. The A-Band has a range of channels in the 313 to 333 MHz bandwidth and the B-Band has a set of channels in the 334 to 354 MHz bandwidth. A mobile radiotelephone will typically be set for either the A-Band or the B-Band depending upon its carrier. Because of the fairly limited number of control channels in AMPS, a mobile radiotelephone can always ensure that a scan through these channels should result in finding an appropriate channel through which service may be obtained. If no channels are found, then the radiotelephone may assume that there is no service in the current area but continue to search periodically.

A new generation of mobile radio telephones is reflected in Telecommunications Industry Association (TIA) standard EIA/TIA IS-136. IS-136 capable mobile radiotelephones transmit and receive digital signals which have been multiplexed together in a time division multiple access (TDMA) system. These digital mobile radiotelephones offer a number of features not found in the pure analog mobile radiotelephones, such as short message service (SMS), voice and data privacy, a message waiting indicator (MWI), calling number identification (CNI), and circuit-switched data support. IS-136 capable digital phones are designed to operate both in the analog spectrum as well as in the purely digital spectrum of the 1900 MHz frequency bands. They provide seamless operation on both the AMPS analog cellular system as well as an IS-136 system.

A core component of the EIA/TIA standard IS-136 is the definition of a digital control channel (DCCH). The DCCH is a new control channel added to existing analog control channels (ACCs), analog voice channels (AVCs), and the digital traffic channels (DTCs) of a TDMA system. The DCCH enables many of the new functions and enhanced features of IS-136. In contrast to analog control channels, the DCCH may be placed on any channel in the frequency range of the mobile radiotelephone system and a radiotelephone network may offer a greater or lesser number of DCCHs than ACCs.

The detection and acquisition of a DCCH, however, is not as easy as the acquisition and detection of an ACC. As discussed above, the AMPS cellular network typically has twenty one control channels with these control channels being set at predefined frequencies. An AMPS cellular phone can quickly scan through the twenty one frequencies to find an ACC through which cellular service may be obtained. In contrast to an ACC, the DCCH may be located at any channel within the frequency range of the cellular carrier. Cellular networks, furthermore, may have differing numbers of DCCHs, with one network possibly having twenty one DCCHs while another neighboring network having thirty three DCCHs. Due to the uncertain number of DCCHs and their uncertain location within the available bandwidth, an IS-136 capable phone cannot quickly or easily perform a scan of the bandwidth to locate a suitable DCCH.

In light of the difficulty of scanning a multitude of channels in order to obtain cellular service, IS-136 phones are commonly provided with a "history list" of channels. The history list is generated by the digital phone dynamically as the phone operates in a cellular environment. Typically, cellular carriers will utilize a common set of channels system-wide in which to place their DCCHs. A digital phone will build its history list of DCCHs by placing on the list those DCCHs through which the phone has obtained service with the first position on the list designated for the DCCH used most recently. When a digital phone attempts to locate a DCCH, the digital phone scans the entire list and removes from consideration those channels below a minimum threshold power level. Of the channels above the threshold, the radiotelephone selects the strongest channel available. A history list could theoretically contain any number of channels which the phone will scan for service, but a balance of the number of channels, the amount of time required to scan them, and the amount of memory required to store them will, as a practical matter, limit the number of DCCHs stored in the history list.

The factors of the time required to scan the channels and the maximum number of channels allowed in memory can greatly affect the performance of a digital cellular phone in a specific cellular network. For example, a digital cellular phone that stores only five channels in its history list operating in a system where the carrier has chosen to use twenty different DCCH channels for reuse across the system will only be effective at best five out of twenty different times. The five channels stored in the phone will preferably be channels that the user has acquired service on previously via different methods whereby the use of these five channels increases the user's chance that one of them will be available. Nonetheless, by increasing the number of DCCHs stored in the history list, the digital phone increases its chances that it will find an available DCCH. For instance, if a digital phone increases the number of DCCHs stored in its history list from five to ten, then the odds that an available DCCH will be found is increased from approximately five out of twenty times to ten out of twenty times.

The structuring of the history list so that it contains the most recently used channels is not without its shortcomings.

This type of history list works well when the user stays within commonly used cells of a cellular network or stays within just one cellular network. When the user enters other cells of the cellular network or enters another cellular network, the location of the DCCHs in these other cells or in this other network may be different from the locations of the DCCH for the cells within which the user typically travels. As a result, when the IS-136 capable phone attempts to locate a DCCH in one of these other cells or in another network, the IS-136 capable phone will likely find it difficult to obtain service using the DCCHs stored in its history list. The history list therefore provides its optimal functionality only when the user limits his or her movement to within a limited number of regularly used cells.

In addition to the problem of the uncertain locations of the DCCHs, a cellular carrier in one network may have a larger number of control channels than a cellular carrier in another network. For instance, one network may have twenty DCCHs while another network may have thirty DCCHs. For a phone that has five DCCHs stored in its history list, the phone has at best a five out of twenty chance of locating a DCCH in the first network and at best a five out of thirty chance of locating a DCCH in the second network. Consequently, the odds of a digital cellular phone acquiring service may be significantly affected by the number of DCCHs employed by a cellular carrier.

In view of the varying locations of DCCHs and the varying number of DCCHs within a cellular network, a given history list within a phone will have varying degrees of success as it travels from one cell to another cell and as it travels between networks. In view of these disparate results, a cellular carrier having a larger number of DCCHs may prefer that the history list contain a larger number of control channels. In such a network, the additional time needed to scan for a DCCH and the increased memory in the phone may be offset by the improved performance of the history list in permitting the digital cellular phone to obtain service. Other cellular carriers, in contrast, may employ a fewer number of DCCHs in their network and may desire just a minimal number of DCCHs in the history list. For these carriers, the additional scan time and additional amount of memory may prove to be overly burdensome on the radiotelephones and on network performance. It has therefore been a problem in balancing the competing desires of the cellular carriers in setting the number of DCCHs in the history list.

Another problem that digital cellular phones have encountered in using the DCCH is known as the "far away DCCH" problem. The far away DCCH problem exists when a DCCH capable phone finds a channel for camping purposes when in fact the digital phone should not camp on that frequency. One instance in which this problem arises is when, due to geographic issues, a cell site which is very far away but is in the line of sight of the mobile radiotelephone has a signal strength sufficiently large that the mobile radiotelephone can use it to obtain service. With the far away problem, the radiotelephone is able to acquire service from a cell even though that radiotelephone is not presently located within that cell. Although the mobile radio telephone can set up a call on the far away cell site, the mobile radiotelephone would likely not be able to get a proper hand off to the next cell that radiotelephone enters since cellular systems typically only hand off from one cell site to an adjacent cell site. Because of the far away DCCH problem, digital cellular phones may encounter an dropped call scenario.

The dropped call scenario can be aggravated by the use of a "neighbor list" of channels. Each cell contains a neighbor list of DCCH channels which can assist the mobile station in reselecting from one cell site DCCH to the next cell site DCCH. This neighbor list of DCCHs is important since the DCCHs found in one cell are chosen to be different from DCCHs in neighboring cells in order to avoid interference. When a mobile radiotelephone enters another cell and attempts to reselect a DCCH on the neighbor list for service, the DCCHs on the neighbor list given to the mobile radiotelephone may very well not exist in the new cell and, as a result, the phone may not be able to reselect. Thus, the far away DCCH problem would impair the ability of a mobile radiotelephone to use a neighbor list to select a DCCH.

A further difficulty encountered by a digital phone occurs as a result of the different RF plans established by the various carriers. The carriers transmit their signals at different levels of power with some carriers transmitting their signals at higher power levels. For example, this scenario is prevalent in areas which employ the use of microcells. For those "hotter" carriers that transmit at higher power levels, the strength of their transmitted signals at cell boundaries will be greater in comparison to those carriers which are not as hot. As a result, the RF plans for the "hotter" carriers will call for a reselection to the next cell at power levels greater than those for the RF plans of other carriers. For instance, a relatively "hot" carrier may design cells within its network so that a radiotelephone should initially acquire a DCCH via history list scanning only if the power level of the DCCH is above −70 dBm. Another carrier, in contrast, may perform its RF planning so that DCCH service should be initially acquired via history list scanning only if the initial DCCH power level is above −95 dBm. Despite the carriers' RF plans, a radiotelephone may initially select another DCCH at a lower power level. The actual history list acquisition threshold within the mobile radiotelephone is set by the manufacturer and is often set without regard to the carrier's RF planning. The power level threshold set by the manufacturer will likely therefore not be optimally set for a given cellular network. As an example, a manufacturer may set the history list acquisition threshold for a mobile radiotelephone at −85 dBm. For this phone and threshold, the phone will more easily find a DCCH in the network designed at the −70 dBm reselection power level in comparison to the network designed at the −95 dBm level. The discrepancy between a manufacturer's set threshold and a carrier's desired threshold is only compounded by the fact that different manufacturers of radiotelephones set their thresholds at different levels. The variations in the thresholds desired by the carriers coupled with the variations in the actual thresholds set by the manufacturers affect the quality of service among the IS-136 capable phones and among the cellular networks.

SUMMARY OF THE INVENTION

The present invention addresses the problems described above by providing systems and methods searching for a digital control channel. According to one aspect of the invention, an over-the-air programming teleservice (OAP) transfers data to a radiotelephone in response to a download event. The data transferred to the radiotelephone includes a search parameter that the radiotelephone stores within its database. The radiotelephone turns to the database for determining the manner in which to search for a digital control channel within a radiotelephone network. The search parameter may comprise any parameter influencing the search by the radiotelephone, but preferably comprises the number of entries in the radiotelephone's history list, an entry for placement within the history list, and a threshold level for the digital control channel.

The invention advantageously allows a carrier to influence the manner in which its subscribing radiotelephones search for digital control channels. As a result, the radiotelephones can be programmed to have a desired number of entries in their history lists, with carriers employing a larger number of digital control channels being able to enlarge the history lists of their subscribing radiotelephones. With the ability of programming the content for the history list entries, carriers are able to increase the chance of a radiotelephone to locate and camp on a digital control channel. Also, the radiotelephones within a network can be programmed as a group or individually, which allows the carrier to ensure that its subscribers use the appropriate cellular network when roaming. By setting the threshold level, carriers can ensure that operations of their subscribing radiotelephones are optimally set for the RF planning of their networks. Consequently, the far away DCCH problem and problems associated with the history list are reduced.

Accordingly, it is an object of the present invention to provide systems and methods for acquiring and using a digital control channel that enables over-the-air programming of a radiotelephone's search algorithm.

It is another object of the present invention to provide systems and methods for acquiring and using a control channel or traffic channel that allows the search algorithm of a radiotelephone to be optimally set.

It is a further object of the present invention to provide systems and methods for acquiring and using a control channel or traffic channel that allows programming of a radiotelephone's history list.

It is yet another object of the present invention to provide systems and methods for acquiring and using a control channel or traffic channel that allows programming of a power level threshold.

It is yet a further object of the present invention to provide systems and methods for acquiring and using a control channel that allows programming of a number of entries in a history list.

It is still a further object of the present invention to provide systems and methods for searching for a digital control channel that allows programming of entries in a history list.

Other objects, features, and advantages of the present invention will become apparent with respect to the remainder of this document.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings.

DETAILED DESCRIPTION

Reference will now be made in detail to preferred embodiments of the invention, non-limiting examples of which are illustrated in the accompanying drawings.

I. Overview

With the invention, the number of DCCH entries in the history list can be dynamically changed according to the desires of a particular cellular network. In general, information on the number of entries in the history list is not statically stored within a mobile station but can be programmed into a radiotelephone, such as through over-the-air programming. As one example, an over-the-air activation teleservice sub-system (OTAF) in the cellular network transmits data to the mobile station through a base station with this data setting the number of entries in the history list. The mobile station then modifies its history list to contain the data transmitted from the OTAF. Rather than using the OTAF and the radiotelephone's transceiver, the radiotelephone may be programmed through a service module 18. The service module 18 may be directly connected to the radiotelephone, such as through a ProgramIt™ module, or may program the radiotelephone through the use of a SIM card. The mobile station, moreover, may be programmed through its keypad where the access is limited through a set of keystrokes.

Because the number of entries in a history list is no longer a fixed amount, a mobile station can be programmed to have the optimal number of entries in its history list for a particular cellular network. Consequently, a cellular network that uses a greater number of DCCHs may increase the number of entries in the history list for its subscribing mobile stations whereas a cellular network that uses a smaller number of DCCH can maintain a smaller number of entries for its subscribing mobile stations.

In addition to updating the number of entries in a history list, a cellular network can also store the content for the entries in a subscribing mobile station's history list. A cellular network can therefore optimize the DCCHs stored in a history list according to a mobile station's present location within the network. The cellular network, moreover, can optimize performance on a system level by programming its subscribing mobile stations with different sets of DCCHs in their history lists. Alternatively, rather than programming each mobile station individually, all mobile stations within a cellular network may be programmed simultaneously.

According to another aspect, the power level threshold for accepting a DCCH is dynamically changed through over-the-air programming. Instead of having a fixed threshold against which all DCCHs in a cellular networks are compared, the threshold power level in a mobile station is optimized for the RF planning of its associated cellular carrier. By having a variable threshold power level, the far away DCCH problem can be reduced and the operation of mobile stations can be optimized for their cellular carriers.

The ability of a cellular network to alter the roaming characteristics of a mobile station will hereinafter generally be referred to as Intelligent Roaming (IR). Through IR, as discussed above, the number of entries in a history list, the content of the entries in the history list, and the power level threshold for a DCCH may all be optimally set for a mobile station. Furthermore, IR allows subscriber mobile stations to obtain the best possible service when roaming across 800 MHz and 1900 MHz systems, as well as other frequency bands.

II. Description of Overall System and Method

Figure 1:
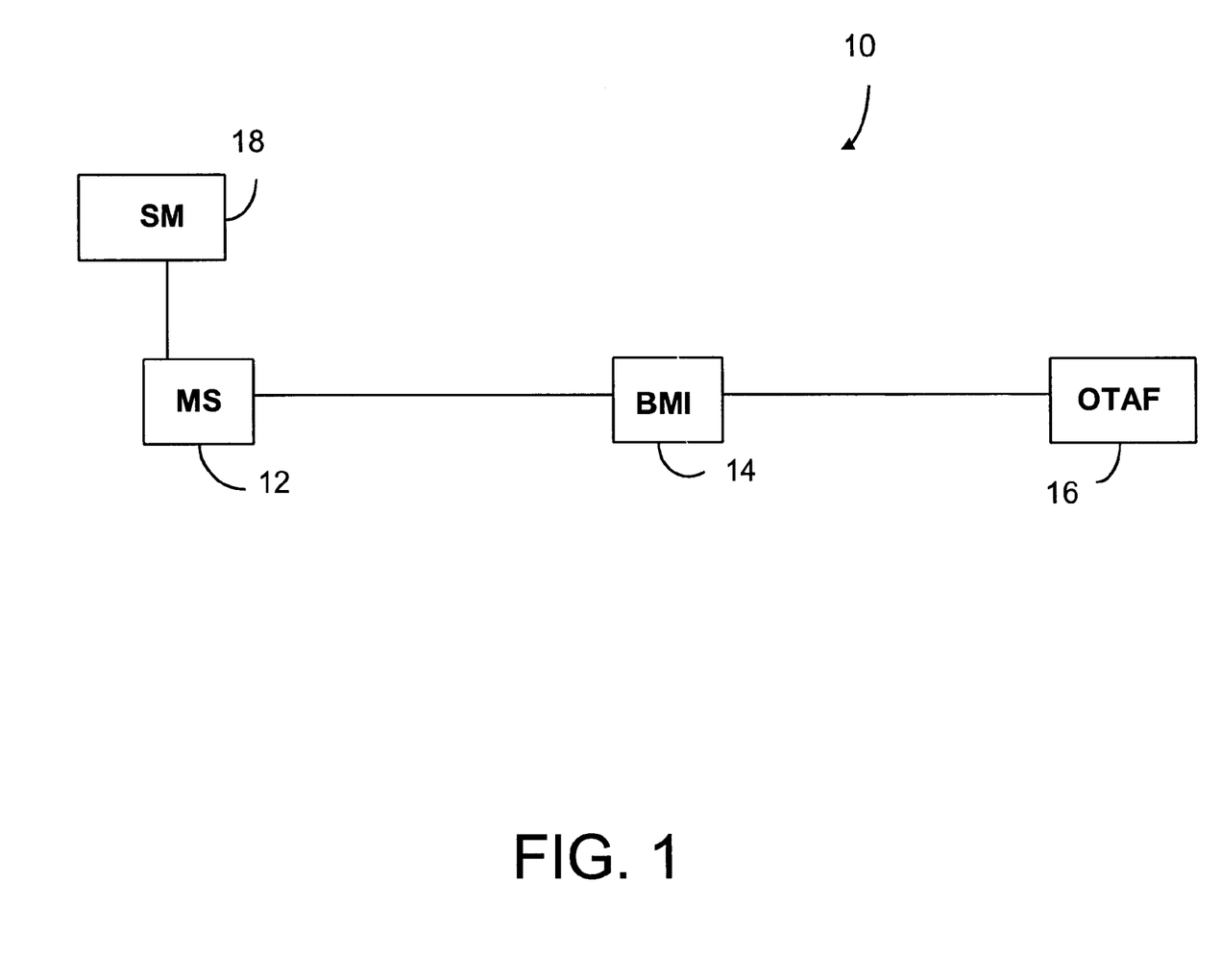
FIG. 1 is a block diagram of a radiotelephone system according to a preferred embodiment of the invention.

With reference to FIG. 1, a system 10 according to the invention comprises a mobile station (MS) 12, a base station/mobile switching center (BMI) 14, and an over-the-air activation teleservice sub-system (OTAF) 16. In general, data is transmitted from the OTAF 16 to the MS 12 through the BMI 14 with this data including Intelligent Roaming (IR) data for establishing the number of entries and content for the entries of a history list and for setting the DCCH power level threshold. As will be discussed in more detail below, information may also be delivered from the MS 12 to the OTAF 16 through the BMI 14. Although the invention will be described with reference to the use of the OTAF 16 to program a mobile station 12, it should be understood that the programming may alternatively occur through a direct connection to the mobile station 12, through the use of a card, such as a SIM card, or via the mobile station's 12 keypad and entry of a predefined sequence of keystrokes.

The MS 12 may be any communication device that allows a subscriber to access the system 10. Although perhaps the most common MS 12 is a mobile radiotelephone, or digital cellular phone, the MS 12 may comprise units installed in vehicles or other such fixed subscriber stations. Also, although only one MS 12 has been shown, the system 10 comprises a plurality of mobile stations 12 with these MSs 12 being of the same type, such as a mobile radiotelephones, or a combination of different types, such as mobile radiotelephones and fixed radiotelephones.

The BMI 14 communicates with the MS 12 to provide service to the MS 12. This service is frequently telephony service involving the use of a voice channel but may encompass other types of service, such as a data-only service which does not include any use of the voice channel. BMI 14 is often a single mobile switching center connected to at least one base station and may use inter-working functions to connect to other cellular networks. Only one BMI 14 has been shown in order to simplify the description of the invention even though the system 10 will likely contain a greater number of mobile switching centers and base stations. Since the operation and function of the BMI 14 will be apparent to those skilled in the art upon reading this disclosure, further details of the BMI 14 have been omitted.

The OTAF 16 may include a single network entity, such as a processing station, or a collection of network entities. As will be appreciated to those skilled in the art, the OTAF 16 can communicate with other entities other than the BMI 14 and MS 12. For instance, the OTAF 16 may need to connect to other network entities, such as a Home Location Register (HLR), in performing its functions.

As shown in FIG. 1, the system 10 also includes a service module (SM) 18 that is used to program the MS 12 with the IR data. The SM 18 may be coupled to the MS 12 through a direct connection or, alternatively, may program the MS 12 through a card, such as a SIM card. Thus, with the SM 18, the MS 12 can be initialized at the time of purchase to have a desired history list and to have a desired power level threshold for the DCCH. Alternatively, or in addition to the use of the SM 18, the MS 12 may be programmed over-the-air with the OTAF 16. Also, as discussed above, the MS 12 may be programmed through its keypad.

Figure 2:
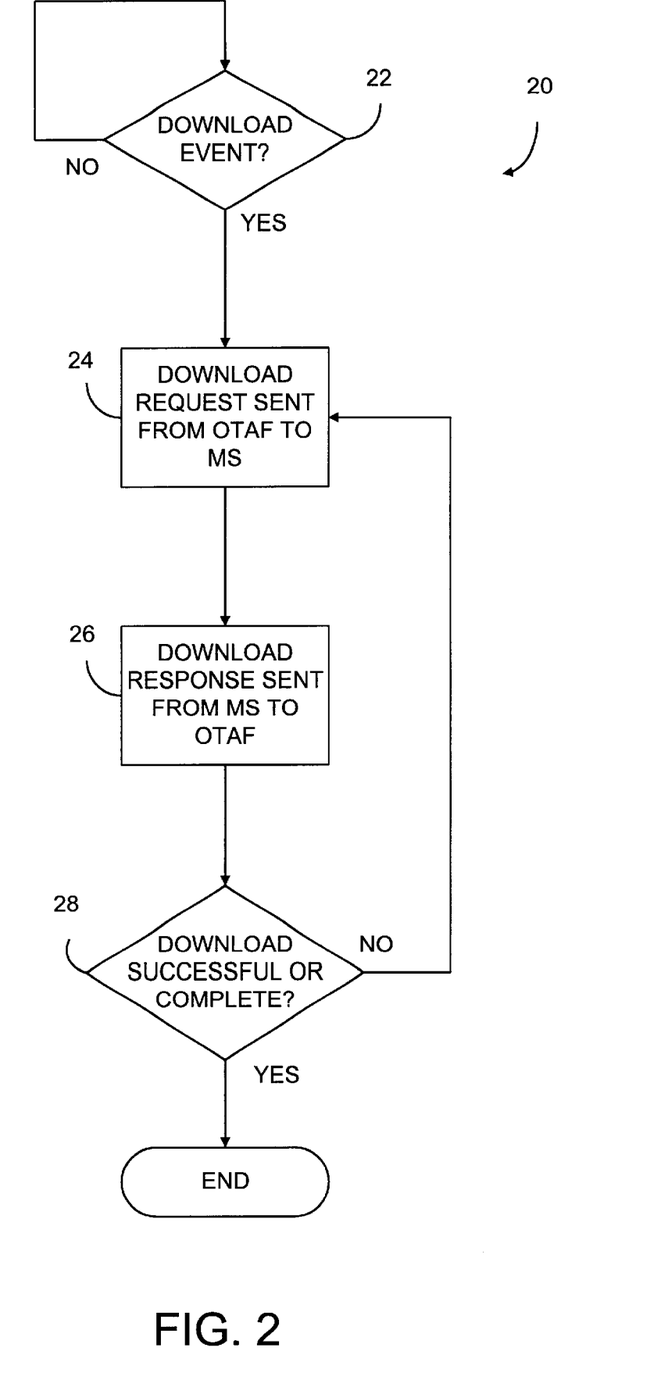
FIG. 2 is a flowchart depicting a download process from an over-the-air activation sub-system to a radiotelephone.

A method 20 for transferring data between the MS 12 and OTAF 16 according to a preferred embodiment of the invention is shown in FIG. 2. The methods for programming the MS 12 through the SM 18 should be apparent from the following description. At a step 22, the OTAF 16 determines whether a download event has occurred. A download event may occur at periodic times or at a predetermined time, such as every hour or once a day at a particular time. The download event may also be triggered by another event or condition. For example, a download event may be triggered by detecting a registration message from a new MS 12 within the system 10. Other examples of a download event will be apparent to those skilled in the art.

At a step 24 in response to a download event, the OTAF 16 transfers a Download Request to the MS 12. The Download Request from the OTAF 16 includes a set of data that the MS 12 places in a database or otherwise uses to set its IR characteristics. The Download Request, for instance, includes content for an Intelligent Roaming Database (IRDB) stored in memory in the MS 12. The Download Request, however, preferably includes other data for use by the MS 12 for other purposes and may comprise a number of individual transmissions in order to transfer all of the necessary data. An example of a Download Request is shown below in Table 1.

TABLE 1

| Information Element | Type | Length |
| --- | --- | --- |
| Protocol Discriminator (PD) | M | 2 |
| Message Type | M | 6 |
| Remaining Length in Octets | M | 8 |
| IRDB Download | O | 8*N |
| Alpha Tag Data | O | 8*N |
| Sub-Band Priority Order Data | O | 8*N |

As shown in Table 1, the IRDB Download may form just a part of the entire transmission from the OTAF 16 to the MS 12 with other parts being directed to a protocol discriminator (PD), an indication of message type, the remaining length in octets, alpha tag data, and sub-band priority data. The message type indicates whether the Download Request contains a IRDB Download, an alpha tag download, or a sub-band priority download. The column for type reflects whether the data is mandatory ("M") or optional ("O") in a Download Request and the column for length indicates the length of the data in bits.

The message types for the various downloads are shown below in Table 2.

TABLE 2

| Parameter Type | Code |
| --- | --- |
| Reserved | 00 0000 |
| IRDB Download Request | 00 0001 |
| Alpha Tag Download Request | 00 0010 |
| Sub-Band Priority Order Download Request | 00 0011 |
| Reserved | All Others |

At step 26, the MS 12 will reply to the Download Request with a Download Response indicating whether or not the Download Request was received. The Download Response may also indicate whether the IRDB was updated successfully. In the event that the Download Request comprises plural transmissions, the Download Response will include a corresponding number of separate transmissions. An example of a Download Response is shown below in Table 3.

TABLE 3

| Information Element | Type | Length |
| --- | --- | --- |
| Protocol Discriminator (PD) | M | 2 |
| Message Type | M | 6 |
| Remaining Length in Octets | M | 8 |
| Download Result Map | M | 16 |

The Download Result Map is a field of the Download Response indicating whether the Download Request was successful. Table 4 provides an exemplary coding for the Download Result Map. The invention, however, is not limited to this particular coding and the results may be coded by a different number of bits, such as only three bits, and may include additional or other responses.

TABLE 4

| Value | Function |
|---|---|
| XXXX XXXX XXXX XXX0 | IRDB Download unsuccessful |
| XXXX XXXX XXXX XXX1 | IRDB Download successful |
| XXXX XXXX XXXX XX0X | Alpha Tag Download unsuccessful |
| XXXX XXXX XXXX XX1X | Alpha Tag Download successful |
| XXXX XXXX XXXX X0XX | Sub-Band Priority Order Download unsuccessful |
| XXXX XXXX XXXX X1XX | Sub-Band Priority Order Download successful |
| All Others | Reserved |

If the Download Request is unsuccessful or incomplete, as determined at step 28, then processing returns to step 24 and the Download Request is retransmitted or the next Download Request is sent. This process may repeat itself until the download is successful or is complete, as shown in FIG. 2, or may instead repeat itself only a certain number of times until a limited number of retries has been reached. After all downloads have been determined to be successful, the process ends.

III. Description of Mobile Station

A. Mobile Station Block Diagram

Figure 3:
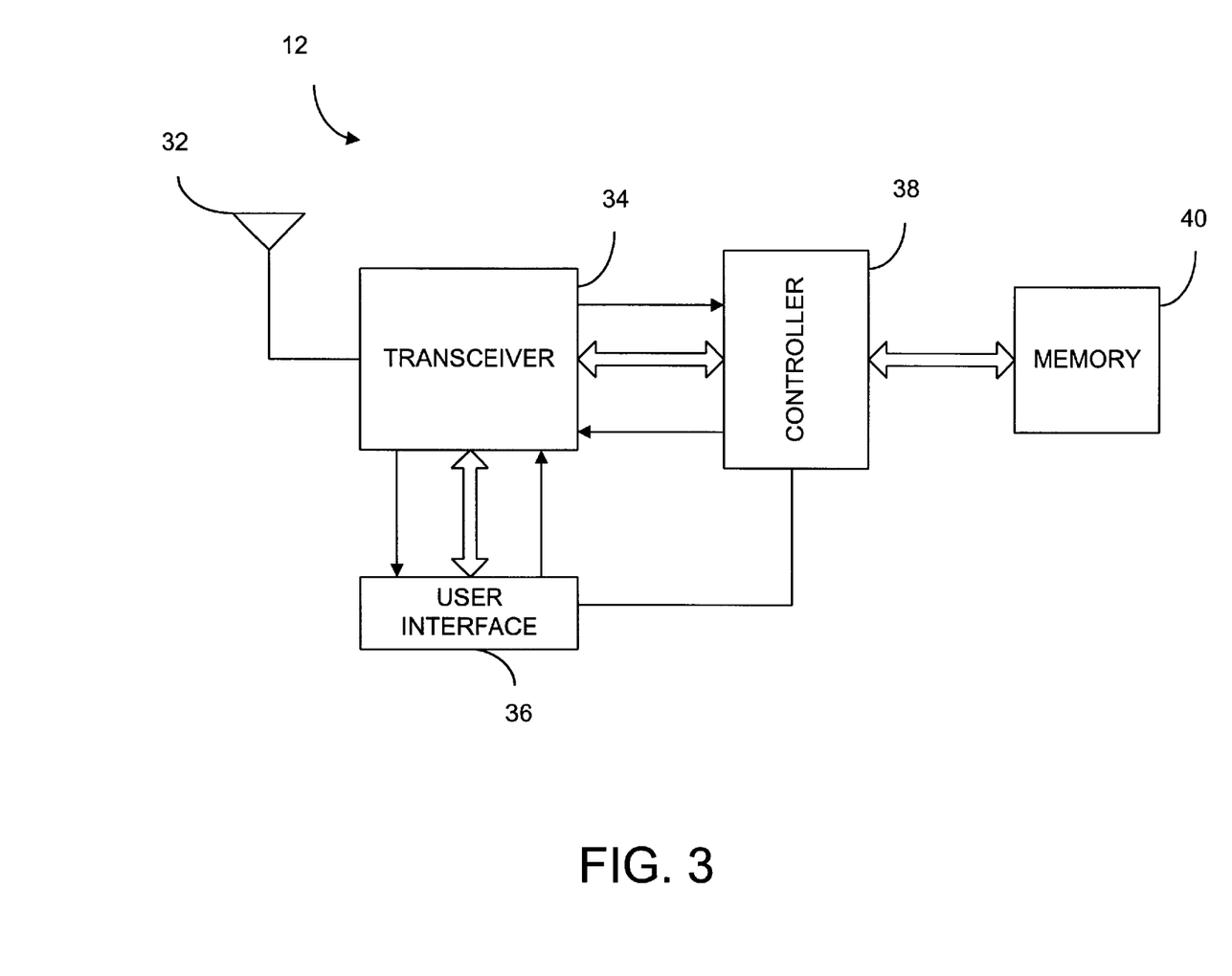
FIG. 3 is a block diagram of a radiotelephone.

A block diagram of an MS 12 is shown in FIG. 3. The MS 12 includes an antenna 32, a transceiver 34, a user interface 36, a controller 38, and memory 40. The single antenna 32 is preferably used for both receiving signals from the BMI 14 and for transmitting signals to the BMI 14, although the MS 12 may comprise separate antennas for transmitting and receiving signals. The received signals detected at the antenna 32 are supplied to the transceiver 34 which converts the signals into a data format acceptable to the controller 38. The transceiver 34, for instance, demodulates the signals and may perform other signal processing, such as decoding and decryption of the signals. The transceiver 34 is connected to the user interface 36 which includes any suitable input or output device. The user interface 36, for instance, may include a microphone, speaker, alert transducer, LED or LCD display, keypad, and any necessary switch and is connected to the controller 38 and to the transceiver 34. The transceiver 34 is also connected to, and communicates with, the controller 38, and the controller 38 may comprises a microcontroller, a digital signal processor (DSP), or both a microcontroller and DSP 4. The memory 40 is connected to the controller 38 and may comprise ROM, static RAM, Dynamic RAM, Flash RAM, or any type of memory. The memory 40, as will be described in further detail below, includes the IRDB associated with IR and includes ROM for storing operating code for the MS 12.

B. Processing of Download Request at Mobile Station

Figure 4:
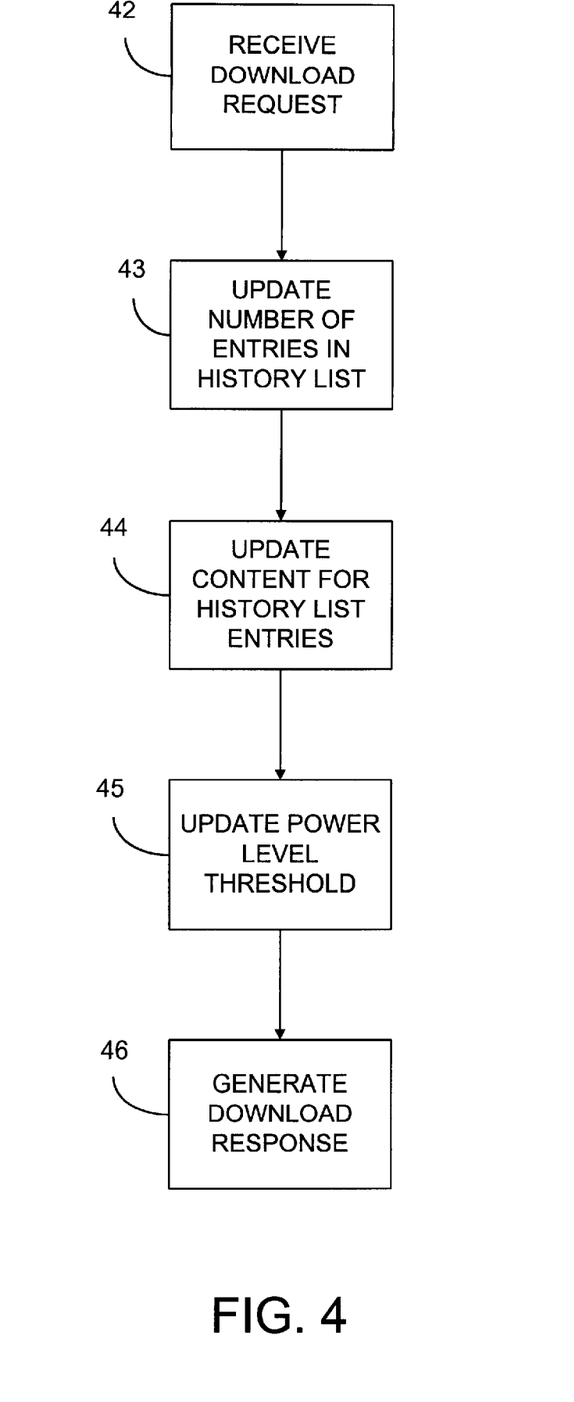
FIG. 4 is a flowchart of processing a download request at a mobile station.

With reference to FIG. 4, the MS 12 receives the Download Request at step 42 and then proceeds to perform the necessary updating of data in its IRDB within memory 40. For instance, if the Download Request specifies the number of entries in the history list, then at step 43 the MS 12 updates its history list to contain the specified number of entries. If the Download Request includes one or more entries of DCCHs, then at step 44 the MS 12 amends its history list to contain the entries for the DCCHs included within the Download Request. Further, if the Download Request includes a power level threshold, then at step 45 the MS 12 replaces its threshold with the threshold transmitted by the OTAF 16 and thereafter uses this new threshold in detecting a suitable DCCH. At step 46, the MS 12 generates the Download Response and transmits the Download Response to the OTAF 16 through the BMI 14.

C. Mobile Station Intelligent Roaming Procedure

Figure 5:
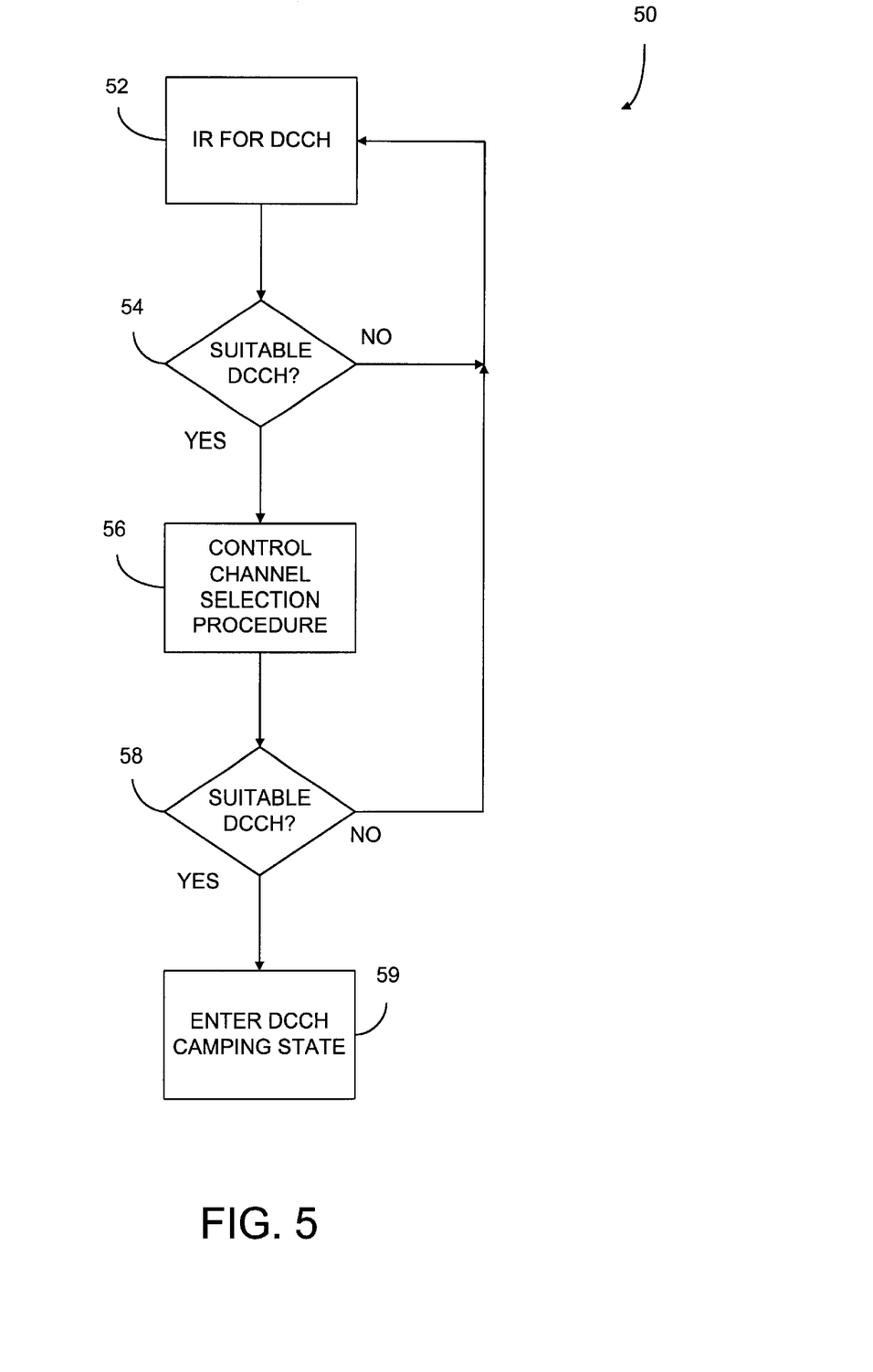
FIG. 5 is a flowchart of an Intelligent Roaming procedure according to a preferred embodiment of the invention.

A general diagram of the IR Roaming procedure 50 in the MS 12 is shown in FIG. 5. As will be recognized by those skilled in the art, the IR Roaming procedure 50 shown in FIG. 5 has been greatly simplified since other steps in the roaming procedure have been omitted in order to clarify the description of the invention. These other steps in the roaming procedure relate to various aspects of a power-up scan, wide-band scan, scanning in digital systems only, scanning in both analog and digital systems, and priorities in bands and sub-bands.

With reference to FIG. 5, at step 52, the MS 12 is triggered to enter into an Intelligent Roaming (IR) search for a DCCH. In general, the MS 12 at step 52, attempts to identify a suitable DCCH with the highest priority Service Provider (SP) based on information stored in the mobile station's NAM, Intelligent Roaming Database (IRDB), Historic Search Database (HSDB), and Non-Public Database (NPDB). The IRDB, HSDB, and NPDB are stored within memory 40. The MS 12 may initiate the IR search at step 52 in response to an event or condition. For instance, the MS 12 may initiate the IR search at step 52 upon power up, in response to a Reselection Trigger Condition, while executing a Triggered Scan Procedure, upon call release, or in response to an emergency call. Other instances for initiating the IR search will be apparent to those skilled in the art. The outcome of the IR search at step 52 is the selection of at least one DCCH. If a suitable DCCH is found, as determined at step 54, then the MS 12 executes a control channel selection procedure at step 56. If the DCCH satisfies criteria for the control channel selection, the MS 12 will enter a DCCH camping state. Otherwise, processing returns to step 52 for the selection of another candidate DCCH.

Figure 6:
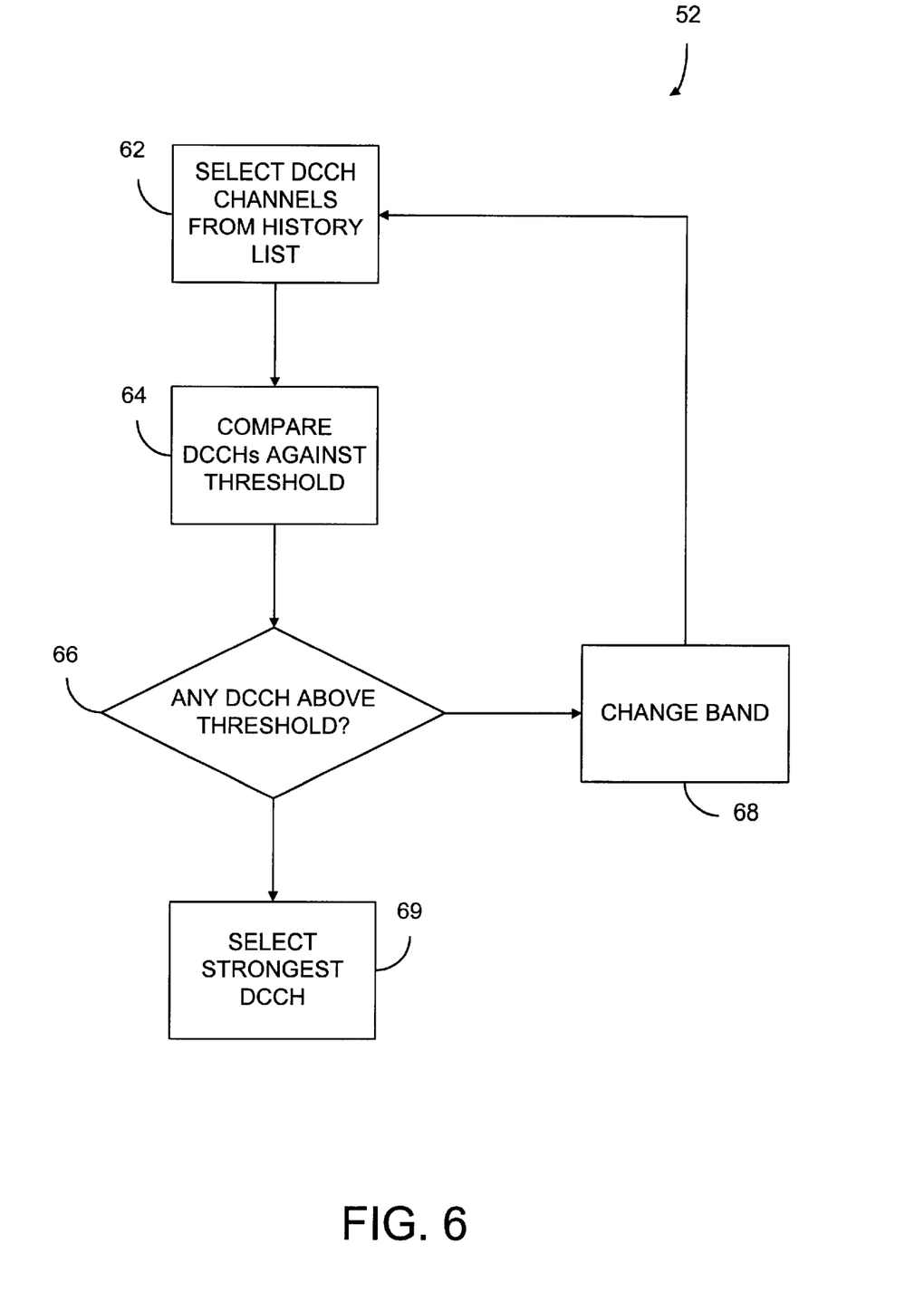
FIG. 6 is a flowchart of a DCCH selection algorithm.

The IR procedure represented by step 52 in FIG. 5 is shown in more detail in FIG. 6. With reference to FIG. 6, the IR procedure includes a step 62 of selecting DCCH channels from the history list. The history list, which will be discussed in more detail below, is stored in a DCCH History Table ("DHT") memory 40 and includes a list of the most commonly used DCCHs. The DHT need not be limited to a single history list but may comprise separate tables containing the most-recently used channels for different bands of service.

At step 64, the MS 12 compares the power levels of the detected DCCHs against the threshold power level. The MS 12 measures the signal strength on each of the DCCHs identified in step 62 to determine if any of them are above the threshold. If none of the DCCHs are above the threshold, then the MS 12 performs a wide-band scan in order to locate a suitable channel. If no channel is found, the MS 12 changes its operating band or exits at step 68 and returns to step 62 to select the DCCHs in the history list for the new band. On the other hand, if some of the DCCHs are above the threshold, then at step 69 the MS 12 selects the DCCH with the strongest signal level.

D. Intelligent Roaming Database (IRDB)

Both the number of entries in the history list and the power level threshold may be set by the OTAF 16 through the BMI 14. The MS 12 can therefore be programmed to have an optimal number of entries in its history list, an optimal set of entries in its history list, and an optimal threshold. These parameters are sent, as discussed above, through a Download Request transmitted by the OTAF 16, received by the MS 12, and stored in the IRDB within memory 40.

The IRDB contains information used during the Intelligent Roaming procedure to identify a service provider (SP). The MS 12 preferably contains a single IRDB, even with multiple NAMs. An example of an IRDB stored in memory 40 is shown below in Table 5.

TABLE 5

| IRDB Contents | Description | Length (bits) |
|---|---|---|
| IR Control Data: Home System Only | If set to 1, mobile station only allows service on the Home SP | 1 |
| IR Control Data: POF Enable | Enables use of POF | 1 |
| IR Control Data: DHT Enable | Enables use of DHT | 1 |
| IR Control Data: ALPHA_TAG Enable | Used to control alpha tag display | 1 |
| IR Control Data: Reserved | Reserved | 4 |
| Band Order | Default order of band searching | 8 * 4 |
| NUM_PRIORITY1_SOC | Number of Priority1 SOCs | 8 |
| Priority1 SOC List | List of Priority1 SOCs | NUM_PRIORITY1_SOC * 16 |
| NUM_PRIORITY1_SID | Number of Priority1 SIDs | 8 |
| Priority1 SID List | List of Priority1 SIDs | NUM_PRIORITY1_SID * 16 |
| NUM_PRIORITY2&3_SOC | Number of Priority2 and Priority3 SOCs | 8 |
| Priority2&3 SOC List | List of Priority2 and Priority3 SOC | NUM_PRIORITY2&3_SOC * 16 |
| NUM_PRIORITY2&3_SID | Number of Priority2 and Priority3 SIDs | 8 |
| Priority2&3 SID List | List of Priority2 and Priority3 SIDs | NUM_PRIORITY2&3_SID * 16 |
| NUM_FORBIDDEN_SOC | Number of Forbidden SOCs | 8 |
| Forbidden SOC List | List of Forbidden SOCs | NUM_FORBIDDEN_SOC * 16 |
| NUM_FORBIDDEN_SID | Number of Forbidden SIDs | 8 |
| Forbidden SID List | List of Forbidden SIDs | NUM_FORBIDDEN_SID * 16 |
| NUM_CELLULAR | Number of probability blocks to search while scanning in an 800 MHz band | 16 |
| NUM_PCS | Number of sub-bands to search while scanning in a 1900 MHz band | 16 |
| RESCAN_TIMER | Time to wait before initiating a partial scan | 16 |
| RESCAN_LOOP | Number of Triggered Partial Scans before initiating a Triggered Power Up Scan | 16 |
| HISTORY_THRESHOLD | RSSI threshold for History Table search | 5 |
| NUM_DHT | Number of entries in the DCCH History Table | 8 |
| NUM_BHT | Number of entries in the Band History Table | 8 |

The IRDB stored in memory 40, as reflected by Table 5, includes a parameter HISTORY_THRESHOLD which specifies the power level threshold against which all suitable DCCHs are compared. The IRDB also includes a parameter NUM_DHT for specifying the number of entries in the history list. Both the HISTORY_THRESHOLD and the NUM_DHT are contained within the IR control data sent by the OTAF 16 to the MS 12 with a Download Request.

The data transmitted to the MS 12 from the OTAF 16 in a Download Request entirely replaces the data in the IRDB stored within memory 40. An exemplary Download Request is shown below in Table 6.

TABLE 6

| Field | Length |
|---|---|
| IR Control Data | 8 |
| Band Order-Band 1 | 4 |
| Band Order-Band 2 | 4 |
| Band Order-Band 3 | 4 |
| Band Order-Band 4 | 4 |
| Band Order-Band 5 | 4 |
| Band Order-Band 6 | 4 |
| Band Order-Band 7 | 4 |
| Band Order-Band 8 | 4 |
| NUM_PARTNER_SOC | 8 |
| Partner SOC list | NUM_PARTNER_SOC * 16 |
| NUM_PARTNER_SID | 8 |
| Partner SID list | NUM_PARTNER_SID * 16 |
| NUM_PRIORITY_SOC | 8 |
| Priority SOC list | NUM_PRIORITY_SOC * 16 |
| NUM_PRIORITY_SID | 8 |
| Priority SID list | NUM_PRIORITY_SID * 16 |
| NUM_FAVORED_SOC | 8 |
| Favored SOC list | NUM_FAVORED_SOC * 16 |
| NUM_FAVORED_SID | 8 |
| Favored SID list | NUM_FAVORED_SID * 16 |
| NUM_FORBIDDEN_SOC | 8 |
| Forbidden SOC list | NUM_FORBIDDEN_SOC * 16 |

TABLE 6-continued

| Field | Length |
| --- | --- |
| NUM_FORBIDDEN_SID | 8 |
| Forbidden SID list | NUM_FORBIDDEN_SID * 16 |
| Number Cellular (NUM_CELLULAR) | 16 |
| Number PCS (NUM_PCS) | 16 |
| Rescan timer (RESCAN_TIMER) | 16 |
| Rescan Loop (RESCAN_LOOP) | 16 |
| HISTORY_THRESHOLD | 5 |
| NUM_DHT | 8 |
| NUM_BHT | 8 |

The IR control data is contained in the IRDB within memory 40 and may be transmitted to the MS 12 from the OTAF 16. An example of the IR control data is shown below in Table 7.

TABLE 7

| Field | Length |
| --- | --- |
| SERVICE_PROVIDER_CONTROL | 1 |
| POF Enable | 1 |
| DHT Enable | 1 |
| ALPHA_TAG_ENABLE | 1 |
| Reserved | 4 |

The memory 40 also includes the DCCH History Table (DHT). The DHT is a dynamic database stored in the MS 12 and is used to speed the process of finding a DCCH. Upon camping on a DCCH, the MS 12 preferably adds an entry to the DHT for the channel number and band associated with the DCCH. The DHT stores up to NUM_DHT entries at any time on a least recently used-first-out basis. The value of the NUM_DHT parameter preferably does not exceed forty two. Once the MS 12 receives an IRDB download, the MS 12 clears the entire DHT and replaces it with the data received in the Download Request.

An example of a DHT entry is provided below in Table 8. Each DHT entry preferably includes at least the DCCH channel number and the band. A DHT entry, however, may include additional information.

TABLE 8

| DHT Entry | Length (bits) |
| --- | --- |
| DCCH Channel Number | 11 |
| Band | 4 |
| Reserved | 1 |

E. DCCH Power Level And Threshold Comparison

The HISTORY_THRESHOLD parameter contained in the IR control data of a Download Request is used by the MS 12 to set the minimum power level which a channel must meet in order to be considered for DCCH camping. The actual threshold for the DCCH is computed according to the following equation:

$$((2*\text{HISTORY\_THRESHOLD})-113) \text{ dBm} \qquad \text{Equation 1}$$

For example, if the HISTORY_THRESHOLD parameter has a value of 21, then the threshold would be ((2*21)−113) dBm, which is equal to −71 dBm. With this example, the MS 12 having a HISTORY_THRESHOLD parameter equal to 21 would only consider a DCCH for camping if its power level exceeded −71 dBm.

To determine whether a candidate DCCH is suitable from a signal strength perspective, the MS 12 preferably uses the following criteria:

1. $C\_SEL_{cand} \geq 0$ dBm AND
2. ($MS\_ACC\_PWR_{cand} \leq 4$ dBm AND Mobile_Station_Power_Class=4) OR $MS\_ACC\_PWR_{cand} \geq 8$ dBm where:

$C\_SEL_{cand}$ is: $RSS_{dBm} - RSS\_ACC\_MIN_{dBm} - MAX(MS\_ACC\_PWR_{dBm} - P_{dBm}, 0_{dBm})$ for the candidate control channel. C_SEL is set to a negative value if the second requirement is not met;

RSS is the received signal strength, averaged over the last 5 measurements. The minimum time between two consecutive measurements is preferably 20 milliseconds;

RSS_ACC_MIN is a parameter broadcast on the F-BCCH Control Channel Selection Parameters message and is the minimum received signal level required to access the cell;

MS_ACC_PWR is a parameter broadcast on the F-BCCH Access Parameters message and is the maximum nominal output power that the MS 12 may use when initially accessing the network;

P is the maximum nominal output power of the MS 12 as defined by its power class; and the Mobile_Station_Power_Class is defined by TIA standard IS-136.2, Table 2.1.2.2.1-1.

Figure 7:
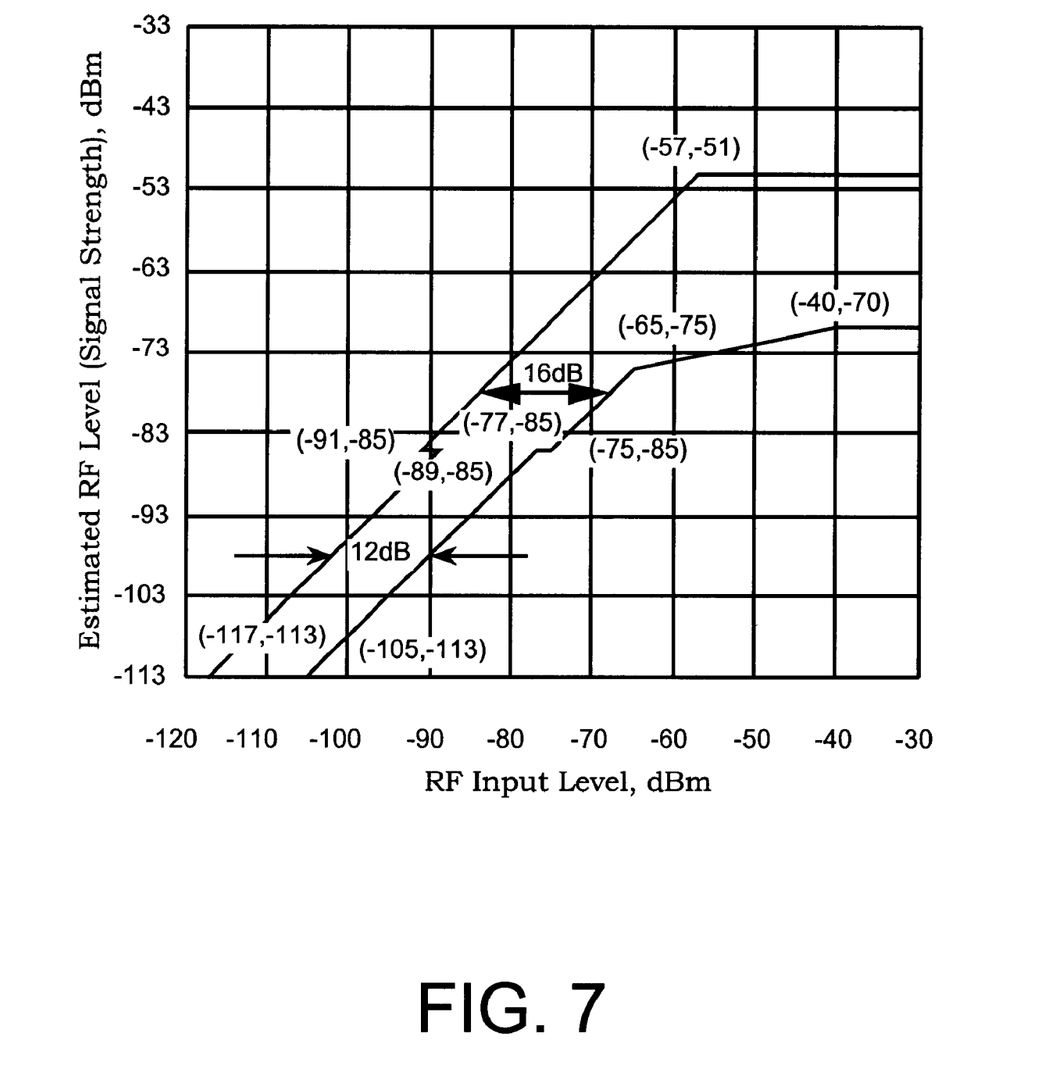
FIG. 7 is a graph of estimated RF level versus RF input level used in measuring signal strength of a DCCH.

The signal strength measurements are preferably made with an absolute accuracy determined as depicted in FIG. 7. The relative accuracy, defined as the error in dB, between the difference of two estimated RF levels and the difference between the corresponding RF input levels, is ±3 dB in the range −105 to −85 dBm of estimated RF levels. If the estimated RF levels spans a wider range, from −105 to −75 dBm, the relative accuracy is preferably ±5 dB. Over the temperature range −30° C. to +60° C., the absolute and relative accuracies shall hold.

The signal strength measurements are preferably encoded according to the Table 9. As shown in Table 9, the signal strength encoding increases monotonically with the received RF signal strength.

TABLE 9

| Bit Pattern | RSS Value |
| --- | --- |
| 00000 | −113 dBm or less |
| 00001 | −111 dBm |
| 00010 | −109 dBm |
| 00011 | −107 dBm |
| . | . |
| . | . |
| . | . |
| 11110 | −53 dBm |
| 11111 | −51 dBm or greater |

F. Content For Entries In History List

The IR control data includes data specifying the number of entries in the history list but need not include the actual content for the entries in the history list. An MS 12 could therefore provide the content for the entries in the history list according to the most recently used DCCHs. The actual content for the history list would therefore not be downloaded by the OTAF 16 in the Download Request.

According to a second embodiment of the invention, the Download Request from the OTAF 16 may also deliver the actual content for the DHT entries. An example of a Download Request containing history list content is shown below in Table 10. The Download Request shown in Table 11 includes data for each entry in the history list. The data for the first entry in the history list is represented by ENTRY_1 with the Download Request including a number of such entries equal to the value of NUM_DHT. As will be apparent to those skilled in the art, the length of the Download Request will vary according to the number of entries downloaded.

TABLE 10

| Field | Length |
|---|---|
| Home Systems Only | 1 |
| POF Enable | 1 |
| DHT Enable | 1 |
| ALPHA_TAG Enable | 1 |
| Reserved | 4 |
| HISTORY_THRESHOLD | 5 |
| NUM_DHT (Number of entries in DCCH History Table) | 8 |
| NUM_BHT (Number of entries in Band History Table) | 8 |
| ENTRY_1 | 16 |
| . | 16 |
| . | 16 |
| . | 16 |
| ENTRY_NUM_DHT | 16 |

By transmitting the content for the history list in the MS 12, the OTAF 16 may program each MS 12 to have a desired set of DCCHs in its history list. The DCCHs in the history list may be the same for all MSs 12 in the system 10 or may be individually set for each MS 12. For example, the content for the history lists may be set by the OTAF 16 after determining the location of the MS 12. Once the location of an MS 12 is determined, the OTAF 16 can set the content for the history list so that it contains DCCHs for the cell within which the MS 12 is located and can also place the DCCHs for neighboring cells within the history list. Other methods for determining the content of the history list will be apparent to those skilled in the art.

G. Configuration Request from OTAF to MS

The OTAF 16 may at times request the configuration of an MS 12. The OTAF 16, for instance, may desire to check the configuration of an MS 12 to ensure that it is proper or may desire to check the configuration as part of a system-wide survey. Upon request from the OTAF 16, or upon its own initiative, the MS 12 sends its configuration data to the OTAF 16. An example of the MS 12 configuration data is set forth below in Table 11.

TABLE 11

| Field | Length |
|---|---|
| IR Control Data | 8 |
| Band Order - Band 1 | 4 |
| Band Order - Band 2 | 4 |
| Band Order - Band 3 | 4 |
| Band Order - Band 4 | 4 |
| Band Order - Band 5 | 4 |
| Band Order - Band 6 | 4 |
| Band Order - Band 7 | 4 |
| Band Order - Band 8 | 4 |
| NUM_CELLULAR | 16 |
| NUM_PCS | 16 |
| RESCAN_TIMER | 16 |
| RESCAN_LOOP | 16 |
| HISTORY_THRESHOLD | 5 |
| NUM_DHT | 8 |
| NUM_BHT | 8 |

The forgoing description of the preferred embodiments of the invention has been presented only for the purpose of illustration and description and is not intended to be exhaustive or to limit the invention to the precise forms disclosed. Many modifications and variations are possible in light of the above teaching.

For example, the systems and methods described may be used to alter any parameter affecting the search for a DCCH. The search parameter is not limited to the number of entries in a history, an entry in the history list, or a power level threshold but may comprise other parameters affecting the search process. Further, the Download Request may comprises any single search parameter or group of parameters.

Also, although the invention has been described with reference to a mobile station 12, the systems and methods for searching for a DCCH may be used with any type of radiotelephone, whether it is mobile or stationary. Moreover, the invention has been described with reference to the search of the digital control channel defined by EIA/TIA standard IS-136. The invention, however, may be used by radiotelephones in searching for other types of digital control channels.

The embodiments were chosen and described in order to explain the principles of the invention and their practical application so as to enable others skilled in the art to utilize the invention and various embodiments and with various modifications as are suited to the particular use contemplated.

What is claimed is:

1. A system for influencing a search through a history list stored in a radiotelephone for a control channel within a selected band performed by the radiotelephone, comprising:
   first means for detecting a download event;
   second means, in response to the download event, for generating a download request, the download request including data for setting a search parameter; and
   third means for transmitting the download request to an interface of the radiotelephone;
   wherein the search parameter is used by the radiotelephone in searching for an acceptable digital control channel and for influencing the history list of control channels stored in the radiotelephone.

2. The system as set forth in claim 1, wherein the search parameter is for setting a number of entries in the history list.

3. The system as set forth in claim 1, wherein the search parameter is a digital control channel entry for storage in the history list.

4. The system as set forth in claim 1, wherein the search parameter is a power level threshold for use by the radiotelephone in finding the acceptable digital control channel.

5. The system as set forth in claim 1, further comprising means for receiving a download response from the radiotelephone.

6. The system as set forth in claim 1, wherein the second means generates the download request specific to the radiotelephone network.

7. The system as set forth in claim 1, wherein the radiotelephone network is an IS-136 network.

8. The system as set forth in claim 1, wherein the digital control channel is defined by EIA/TIA standard IS-136.

9. The system as set forth in claim 1, wherein the interface comprises a radio transmitter for transmitting the download request to the radiotelephone over a radiotelephone network.

10. The system as set forth in claim 1, wherein the interface comprises a connector for coupling the radiotelephone to the third means.

11. The system as set forth in claim 1, wherein the interface comprises a card for being inserted into the radiotelephone.

12. The system as set forth in claim 11, wherein the card comprises a SIM card.

13. The system as set forth in claim 1, wherein the interface comprises a keypad for receiving the download request via a sequence of keystrokes.

14. A radiotelephone for use in a radiotelephone network having a control channel, comprising:
   an interface for receiving a download request;
   a memory for storing at least one search parameter within a history list of control channels;

a controller for receiving the download request from the interface and for replacing the search parameter stored in the history list in memory with at least part of the data in the download request;

wherein the controller is influenced by the search parameter in the history list in searching for an acceptable control channel.

15. The radiotelephone as set forth in claim 14, wherein the search parameter alters at least partially the history list.

16. The radiotelephone as set forth in claim 15, wherein the search parameter contains a value for a number of entries in the history list and the controller sets the number of entries in the history list based on the search parameter.

17. The radiotelephone as set forth in claim 15, wherein the search parameter contains a control channel entry for the history list and the controller places the digital control channel entry in the history list.

18. The radiotelephone as set forth in claim 14, wherein the search parameter is a power level threshold and wherein controller compares a signal strength of a candidate control channel to the power level threshold in order to select the acceptable control channel.

19. The radiotelephone as set forth in claim 14, wherein the controller generates a download response in reply to the download request and supplies the download response to the interface for transmission to an OTAF.

20. The radiotelephone as set forth in claim 14, wherein the radiotelephone is an IS-136 capable phone.

21. The radiotelephone as set forth in claim 14, wherein the digital control channel is defined by EIA/TIA standard IS-136.

22. The radiotelephone as set forth in claim 14, wherein the interface comprises a transceiver for receiving the download request over a radiotelephone network.

23. The radiotelephone as set forth in claim 14, wherein the interface comprises a connector for coupling the radiotelephone to a means for generating the download request.

24. The radiotelephone as set forth in claim 14, wherein the interface comprises a card for being inserted into the radiotelephone.

25. The radiotelephone as set forth in claim 24, wherein the card comprises a SIM card.

26. The radiotelephone as set forth in claim 14, wherein the interface comprises a keypad for receiving the download request via a sequence of keystrokes.

27. A method for influencing a search through a history list for a control channel within a selected band performed by a radiotelephone, comprising:

detecting a download event;

in response to the download event, generating a download request with the download request including data for setting a search parameter within the history list of control channels; and transmitting the download request to the radiotelephone through an interface;

wherein the search parameter within the history list influences a search performed by the radiotelephone for an acceptable control channel.

28. The method as set forth in claim 27, further comprising a step of receiving the download request at the radiotelephone.

29. The method as set forth in claim 28, further comprising a step of updating a database in the radiotelephone with the search parameter.

30. The method as set forth in claim 28, further comprising a step of searching for the acceptable control channel based on the search parameter.

31. The method as set forth in claim 28, further comprising a step of altering a search for the acceptable control channel based on the search parameter.

32. The method as set forth in claim 28, further comprising a step of generating a download response at the radiotelephone in reply to the download request and transmitting the download response to the interface.

33. The method as set forth in claim 28, further comprising a step of updating at least one entry in a history list based on the search parameter.

34. The method as set forth in claim 28, further comprising a step of updating a threshold level based on the search parameter.

35. The method as set forth in claim 34, further comprising a step of comparing a signal strength of a candidate control channel to the threshold level to detect the acceptable control channel.

36. The method as set forth in claim 27, wherein the step of transmitting the download request to the radiotelephone comprises a step of transmitting the download request through a transceiver of the radiotelephone.

37. The method as set forth in claim 27, wherein the step of transmitting the download request to the radiotelephone comprises a step of transmitting the download request to the radiotelephone through a direct connection to the interface.

38. The method as set forth in claim 27, wherein the step of transmitting the download request to the radiotelephone comprises a step of inserting a card into the radiotelephone.

39. The method as set forth in claim 38, wherein the step of inserting a card comprises a step of inserting a SIM card.

40. The method as set forth in claim 27, wherein the step of transmitting the download request to the radiotelephone comprises a step of entering a sequence of keystrokes on a keypad of the radiotelephone.

* * * * *